United States Patent [19]

Tornetta

[11] Patent Number: 4,870,576
[45] Date of Patent: Sep. 26, 1989

[54] REAL ESTATE SEARCH AND LOCATION SYSTEM AND METHOD

[75] Inventor: Mark A. Tornetta, Plymouth Meeting, Pa.

[73] Assignee: Realpro, Ltd., Plymouth Meeting, Pa.

[21] Appl. No.: 841,515

[22] Filed: Mar. 19, 1986

[51] Int. Cl.⁴ .............................................. H04N 7/08
[52] U.S. Cl. .................................. 364/401; 364/200; 364/900
[58] Field of Search .................. 340/945, 286 M, 731, 340/712, 709; 364/401, 200, 900

[56] References Cited

U.S. PATENT DOCUMENTS

| | | | |
|---|---|---|---|
| 3,949,191 | 4/1976 | Crowther et al. | 235/380 |
| 4,312,577 | 1/1982 | Fitzgerald | 340/286 M |
| 4,400,780 | 8/1983 | Naguo et al. | 340/731 |
| 4,429,385 | 1/1984 | Cichelli et al. | 364/900 |
| 4,635,136 | 1/1987 | Ciampa et al. | 364/900 |

OTHER PUBLICATIONS

Schiffres, M., "Mortage Hunting Made Easier", U.S. News of World Report, Blue Chip Edition, Mar. 31, 1986, BC₃ (Nexis TM excerpts).

Naylor, B., "Ground Control to Major Match", American Banker, Apr. 19, 1985, 23 (Nexis TM excerpts).

Young, G., "Computer Form to Help Buyer Shop for Loans", Washington Post, Virginia Real Estate Section, Apr. 4, 1984, E1, (Nexis TM excerpts).

"Introduction to the PRC Multiple Listing Service System", PRC Realty Systems, pp. 1-4.

Primary Examiner—Jerry Smith
Assistant Examiner—Kimthanh T. Tbui
Attorney, Agent, or Firm—Ratner & Prestia

[57] ABSTRACT

A novel system and method for locating real estate properties for potential purchase including a graphical locator interface which permits definition of a desired area for search by placing of a user-controlled selector on a map displayed on a CRT. Additional search qualifications including price, type of structure and others are also specified. The completed specification is then transmitted to a host system and is used for a search of a database of available properties.

4 Claims, 13 Drawing Sheets

SEARCH WINDOW CENTER TO INDEPENDENCE HALL DISTANCE = 16.3 MILES   FIG. 3A
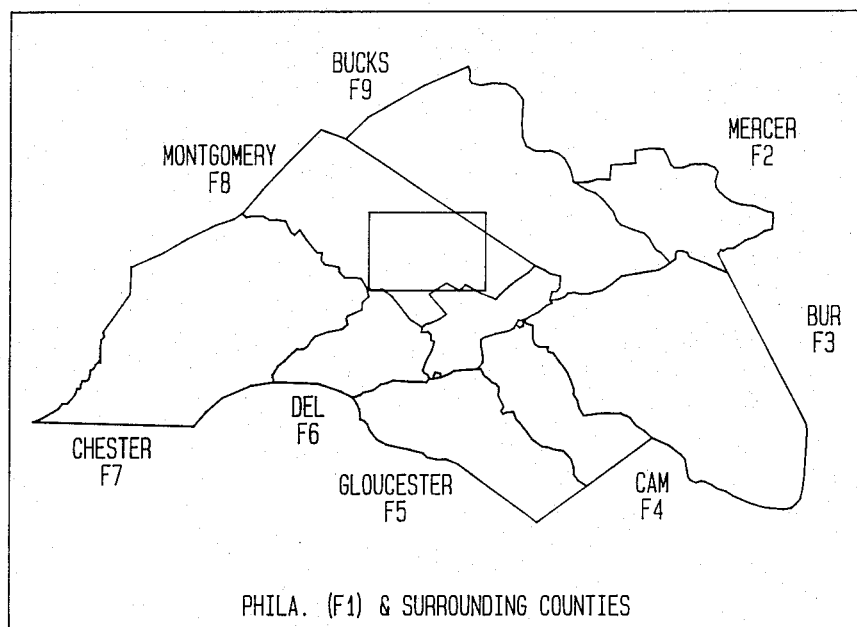
KEYPAD --> ARROWS=NEWS, +,-, PGDN=ZOOM, F1 THRU F9=COUNTY LANDMARKS
CIRCLE CENTER TO INDEPENDENCE HALL  DISTANCE=14.5M  RADIUS=3.0M   FIG. 3B
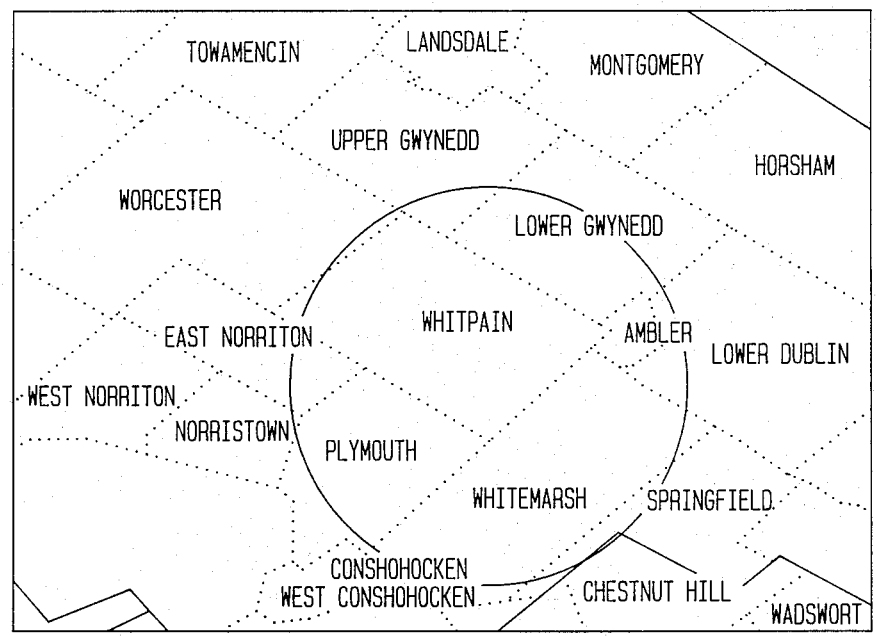
KEYPAD --> ARROWS=NEWS, +,-, PGUP=ZOOM, HOME END=SET/EXIT

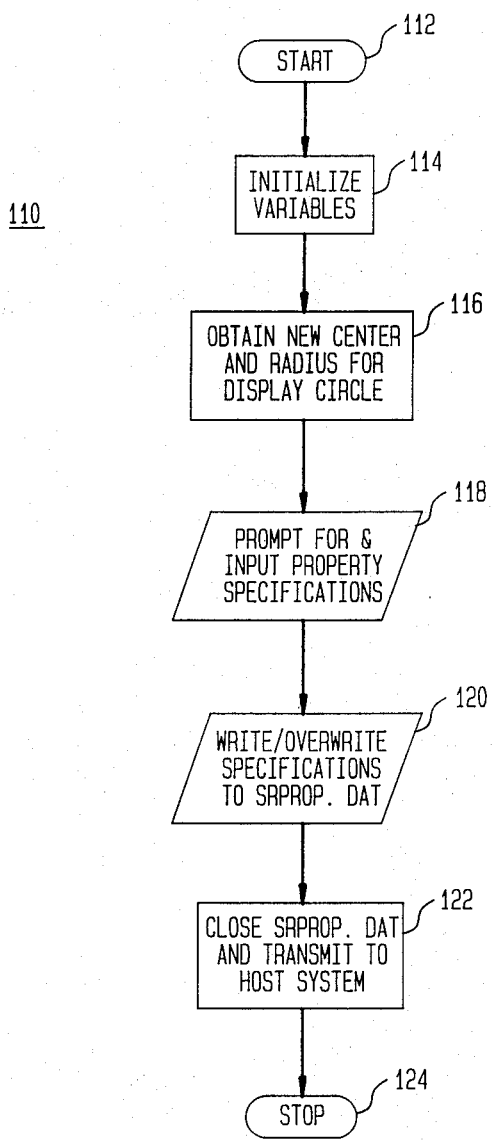

4,870,576

REAL ESTATE SEARCH AND LOCATION SYSTEM AND METHOD

TECHNICAL FIELD

The present invention pertains to data processing systems for the location of real estate properties for purchase through the use of an interactive graphical locator interface for developing geographic area indications.

BACKGROUND OF THE INVENTION

Listings of available real estate are typically stored in a central computer system, generally referred to as a "multiple listing service". This computer-stored listing may be accessed through terminals for retrieval of specific information relating to a given property. However, search of the stored information is typically dependent on the operator's intricate knowledge of the local area, its political subdivisions, and informal housing tract designations. Furthermore, such listings are usually maintained for each county, and multiple accesses of diverse systems are often required for a complete location of all available properties. Finally, no provision for searches by multiple criteria, including geographic location is made in prior systems.

THEORY OF THE INVENTION

The system and method of the present invention comprises a host system for maintaining a database of available properties, receiving data from both buyers and sellers of properties, and searching the database using buyer's criteria. The system and method of the present invention also comprises seller and remote systems for creating, storing, updating, and transmitting buyer and seller data to the host. All geographic location performed by the system of the present invention employs a graphical locator interface for specifying property locations.

The user can create a property search file by selecting the "Create" option from the Main Menu. A viewport is displayed and map boundaries are drawn onscreen. Inside this display the user can control the position and size of a rubberband window box.

A labeled distance indicator is displayed which calculates the distance between the window box center and the selected landmark location. The user can change the landmark location from a menu of landmarks. The label and distance indicator are then updated automatically. As the user changes the window box position, the labeled distance indicator changes to reflect the distance from the displayed landmark.

The user can then change the world coordinate display to equal the boundaries of the window box. The size of the viewport remains constant so that the display now appears to have zoomed down closer to earth. Map boundary lines are displayed with greater detail and a rubberband circle is displayed which allows the user to enclose a search boundary on the map. The user can then either return to the original zoom-up display or save the center location and radius values of the rubberband circle.

The labeled distance indicator is redisplayed and now calculates the distance between the rubberband circle center and the current landmark location. The user can change the size of the rubberband circle. A radius indicator is displayed which calculates the radius of the rubberband circle. As the user changes the position and size of the rubberband circle, the labeled distance and radius indicators are updated to reflect the changes.

Having entered the search location boundary, the user is then prompted for the numerical range data entries.

Having selected numerical range data values, the user is then prompted with a series of menus and asked for selections.

When the final menu is displayed and all data entries have been successfully entered, the user has successfully created a property search file and is returned to the Main Menu.

The present invention comprises a system for computer software for creating and maintaining both a real estate property database and a corresponding file of hard-copy real estate property listing advertisements, and for allowing searches of the database. A "host system" having a database can be searched from "remote" computer systems by the use of a public domain software program that is menu driven and includes a graphical locator interface to specify accurate search location boundaries.

The search facility enables a remote user to obtain a custom selected portion of the hard-copy property listing file without having to obtain the entire file. The search facility also enables the user to obtain many different custom-selected sets of files from the hard-copy property listing file.

The system of the present invention is implemented as three main computer systems:

1. A host system which accepts both property listing files and property search files from remote locations, maintains the property database and performs searches, reports system errors, maintains customer accounts, and calculates statistics.

2. A property listing maintenance system which enables a remote user to create and update a property listing file and then transmit it to the host system.

3. A property search maintenance program that enables a remote user to create and update a property search file and then transmit it to the host system.

HOST RECEIVING SYSTEM

The host system polls a standard telephone line while waiting for remote data transmissions. When the host system receives a call, it brings the telephone line off-hook. If a carrier signal is detected, the host system conforms to the specified communication parameters and waits for incoming data.

The host system receives and echoes a start-of-message protocol followed by an echoed data file transmission followed by an echoed end-of-message signal. The host system then checks the received data file against customer account lists and determines an appropriate diagnostic response which it transmits back to the remote system. The host system then goes back on-hook and polls the telephone line for more calls.

Any data transmission errors occurring after the host system brings the telephone line off-hook cause the host system to hang up and poll for more calls.

MAINTAIN

Received data files are placed on queues set up for batch processing. A search queue, an addition queue, and a deletion queue are all processed for application to the property database. When batch processing in the host system begins, the host reads the property database into memory and processes the deletions queue. Next, the addition queue is added to the property database. The updated property database is then sorted so that the search queue may be processed. When all the search processing is complete, the property database is then sorted again for filing and over-written to the property database file on disk.

SEARCH

The search processing procedure compares property data records to the search being processed. Numerical fields in the property data records are checked against the associated numerical ranges of the search. Property data menu selections are checked against their associated search menu selection arrays. The distance from the property data records' location to the search area center location is calculated and compared to the search boundary radius value. The search processing produces several files that are used for further processing. A file of search results is produced which contains an identification for each search on the search queue plus a list (if any) of the properties that were selected in the search. From this file, a file of customer mailing labels is produced. Another file is also created which contains a count of the number of times each property data record was selected during the search processing. This simplifies hard-copy duplication tasks and eliminates unnecessary duplications.

During the subsequent processing, hard-copy duplicates are made for materials relating to each property selected. The results of each search are collected from the duplicates and labeled for shipping. The finished search results are then shipped to customers.

ACCOUNTING

Customer accounts are created and maintained by separating the customers into two groups—Buyers and Sellers. Buyer accounts are used to search the property data file while Seller accounts are used for property listings.

The Buyer account list contains records with identification data fields and financial resource data fields. The Buyer account system interactively prompts for new Buyer accounts—automatically assigning serial numbers, and new payment data. The Buyer account list is then read into memory from the Buyer account file so that new accounts and payments can be added. The resource field that accounts for time on the system is automatically updated. Buyer account records with deficient resource fields are automatically deleted. The Buyer account file is then overwritten.

Similarly, the Seller account list also contains records with identification data fields plus a resource data field. The Seller account system interactively prompts for Seller accounts to be terminated, new Seller accounts—automatically assigning serial numbers, and new payment data. The Seller account list is then read into memory from the Seller account file so that new accounts and payments can be added and terminations processed. The resource field that accounts for time on the system is automatically updated. Seller account records with a deficient resource field are automatically deleted. The Seller account file is then overwritten.

A log is written during the accounting process to document all entries. It also serves to document any automatic processing which may occur.

Both the Buyer and Seller accounting systems produce receipt files which are printed to inform the customer of the results of processing. Serial numbers and payment receipts are issued in this manner. Seller terminations receipts are also issued in this manner.

STATISTICS

The host system calculates statistics by reading the property data file into memory and traversing the property database. Minimum, maximum, count, percentage, mean, and standard deviation statistics are then calculated where applicable and written to a file with all statistics being clearly labeled. This file includes special printer functions so that a neat and organized report can be printed.

A system check routine is included to track potential errors in both the Buyer and Seller accounting systems. In the Seller accounting system, the Seller account file is checked against the property database and the errors are reported. In both the Buyer and Seller accounting systems, accounts with deficient resources are also reported.

PROPERTY LISTING FILE PROGRAM

The Property Listing File Program is used to create, maintain, and transmit property listing files to the host system. It interactively prompts for entries, is error trapped, and requires no previous knowledge about either the remote or host systems.

The user can create a property listing file by selecting the "Create" option from the Main Menu. A viewport is displayed and map boundaries are drawn on screen. Inside this display, the user can control the position of a rubberband window box.

The user may then change the world coordinate display to equal the boundaries of the window box. The size of the viewport remains constant so that the display now appears to have zoomed down closer to earth. Map boundary lines with erasable labels are displayed with greater detail and a moveable crosshair cursor is displayed which allows the user to pinpoint a location on the map. The user can then either return to the original zoom-up display or save the location of the crosshair cursor.

Having selected a location, the user is then prompted for the address of the property. The user must enter an address.

Having entered the address, the user is then prompted for numerical property data entries. If an invalid value is entered the user is again prompted for the same input.

Having selected numerical property data values, the user is then prompted with a series of menus and asked for selections. If an invalid menu selection value is entered the user is again prompted for the same input.

When the final menu is displayed and all data entries have been successfully entered, the property listing data is over-written to a disk file. The user has successfully created a property listing file and is returned to the Main Menu.

From the Main Menu the user can then choose to update the property listing file currently on disk. By selecting the "Display/Update" option the property listing data is read into memory and the Display/Update menu is displayed to allow the user to update either the location, address, numerical or menu data sections separately. When the user is finished editing a section, he s returned back to the Display/Update menu to allow him to edit another section. When the user is finished updating the property listing data, the property listing data is over-written to the disk file and the user is returned to the Main Menu.

The address update procedure displays the property address data and allows the user to edit each portion of the address separately. After editing a portion of the address, the entire address is redisplayed. When the user is satisfied with the address data, he is returned to the Display/Update menu.

The location update procedure is identical to the property listing map/location interface described previously.

The numerical data update procedure displays the numerical data and allows the user to edit each portion separately. After editing a portion of the numerical data, the numerical data is redisplayed. When the user is satisfied with the numerical data, he is returned to the Display/Update menu.

The menu data update procedure displays the menu data and allows the user to edit each portion separately. After editing a portion of the menu data, the menu data is redisplayed. When the user is satisfied with the menu data, he is returned to the Display/Update menu.

When the user is satisfied that the property listing file is complete, he can select the "Print" option from the Main Menu to print the Property Listing File. The property listing data is read into memory and copied to the printer with each value clearly labeled. When the printing is completed, the user is returned to the Main Menu.

The completed property listing file may be transmitted to the host system by selecting the "Send" option from the Main Menu. The user is then prompted for account identification data. The property listing file is read into memory and the account identification data added to it. All dialing and communications parameters are set automatically and the program takes the remote system off-hook and dials the host system. The remote system then waits for a carrier tone. If no carrier is present the remote system times-out and returns a diagnostic error message to the user. If a problem exists with the remote system while off-hook, the program brings the system back on-hook and displays a diagnostic error message or aborts processing.

If the remote system receives a carrier tone from the host system, he connection is established and the remote system issues the echoed start of message protocol. The echoed property listing file is then sent to the host computer followed by an echoed end of message signal. The remote system then waits for a diagnostic message from the host system and displays the message to the user. The program then brings the telephone line back on-hook and returns the user to the Main Menu.

PROPERTY SEARCH FILE PROGRAM

The Property Search File Program is used to create, maintain, and transmit property search files to the host system. It interactively prompts for entries, is error trapped, and requires no previous knowledge about either the remote or host systems.

From the Main Menu the user can then choose to update the property search file currently on disk. By selecting the "Display/Update" option the property search data is read into memory and the Display/Update menu is displayed to allow the user to update either the location, numerical ranges or menu data sections separately. When the user is finished editing a section, he is returned back to the Display/Update menu to allow him to edit another section. When the user is finished updating the property search data, the property search data is over-written to the disk file and the user is returned to the Main Menu.

The location update procedure is identical to the search location map interface described previously.

The numerical range data update procedure displays the numerical range data and allows the user to edit each portion separately. After editing a portion of the numerical range data, the numerical range data is redisplayed. When the user is satisfied with the numerical range data that is displayed, he is returned to the Display/Update menu.

The menu data update procedure displays a category menu to allow the user to edit each portion of the menu data separately. After editing a portion of the menu data, the menu data is redisplayed. When the user is satisfied with the menu data, he is returned to the Display/Update menu.

When the user is satisfied that the property search file is complete, he can select the "Print" option from the Main Menu to print the Property Search File. The property search data is read into memory and copied to the printer with each value clearly labeled. When the printing is completed, the user is returned to the Main Menu.

The completed property search file may be transmitted to the host system by selecting the "Send" option from the Main Menu. The user is then prompted for account identification data, search name data, baud rate data, and dialing prefix data. The property search file is read into memory and this data is added to it. The remaining communications parameters are set automatically and the program takes the remote system off-hook and dials the host system. The remote system then waits for a carrier tone. If no carrier is present the remote system times-out and returns a diagnostic error message to the user. If a problem exists with the remote system while off-hook, the program brings the system back on-hook and displays a diagnostic error message or aborts processing.

If the remote system receives a carrier tone from the host system, the connection is established and the remote system issues the echoed start of message protocol. The echoed property search file is then sent to the host computer followed by an echoed end of message signal. The remote system then waits for a diagnostic message from the host system and displays the message to the user. The program then brings the telephone line back on-hook and returns the user to the Main Menu.

BRIEF DESCRIPTION OF THE FIGURES

FIG. 3A is a depiction of a map generated on a CRT according to the present invention.

FIG. 3B is a map showing greater detail and displayed on a CRT according to the present invention.

FIG. 4 is a flow diagram of the procedure create buyers search specification file.

DETAILED DESCRIPTION

Figure 1:
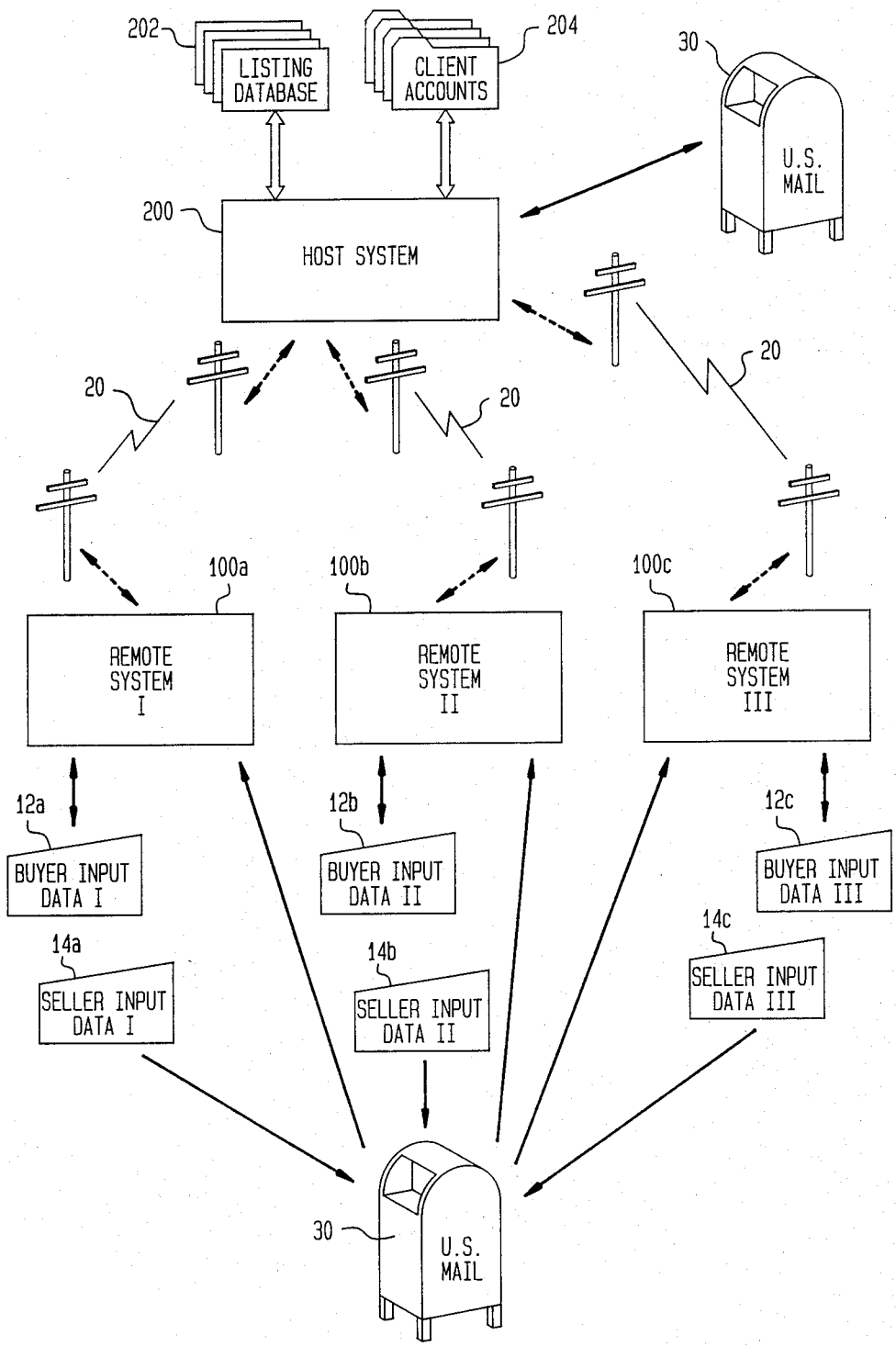
FIG. 1 is an overall block diagram of a system typical of the present invention.

Referring now to FIG. 1, there is shown an overview block diagram of the entire system of the invention which includes a host computer system 200 which is connected by telecommunications links 20 to a plurality remote computer systems 100A, 100B and 100C. Host system 200 maintains a database of property listings 202 which contains a plurality of property listings submitted by those with properties to sell. The database is used for search and delivery of relevant property information to those inquiring of the system with certain specifications to be described later. Host system 200 also maintains a set of client accounts 204, one account per client (either a buyer or seller). Charging for the use of the system is based upon a continual update of these client accounts. Host system 200 also uses a mail service 30 such as the U.S. mail service (but not limited thereto) for communication and billing purposes. Each remote system, 100A, 100B and 100C, is capable of interrogating the database 202 by communicating a set of specifications for a desired property to be purchased to host system 200. These specifications are derived from buyer input data 12A, 12B and 12C. The buyer input data is interactively gathered from the buyer by the remote system, formatted, and transmitted with an error-checking protocol to the host system which then batches the interrogation requests for subsequent processing off-line. Similar to the communications functions by host system 200, communications also occur with sellers and remote system operators through mail service 30.

Figure 2:
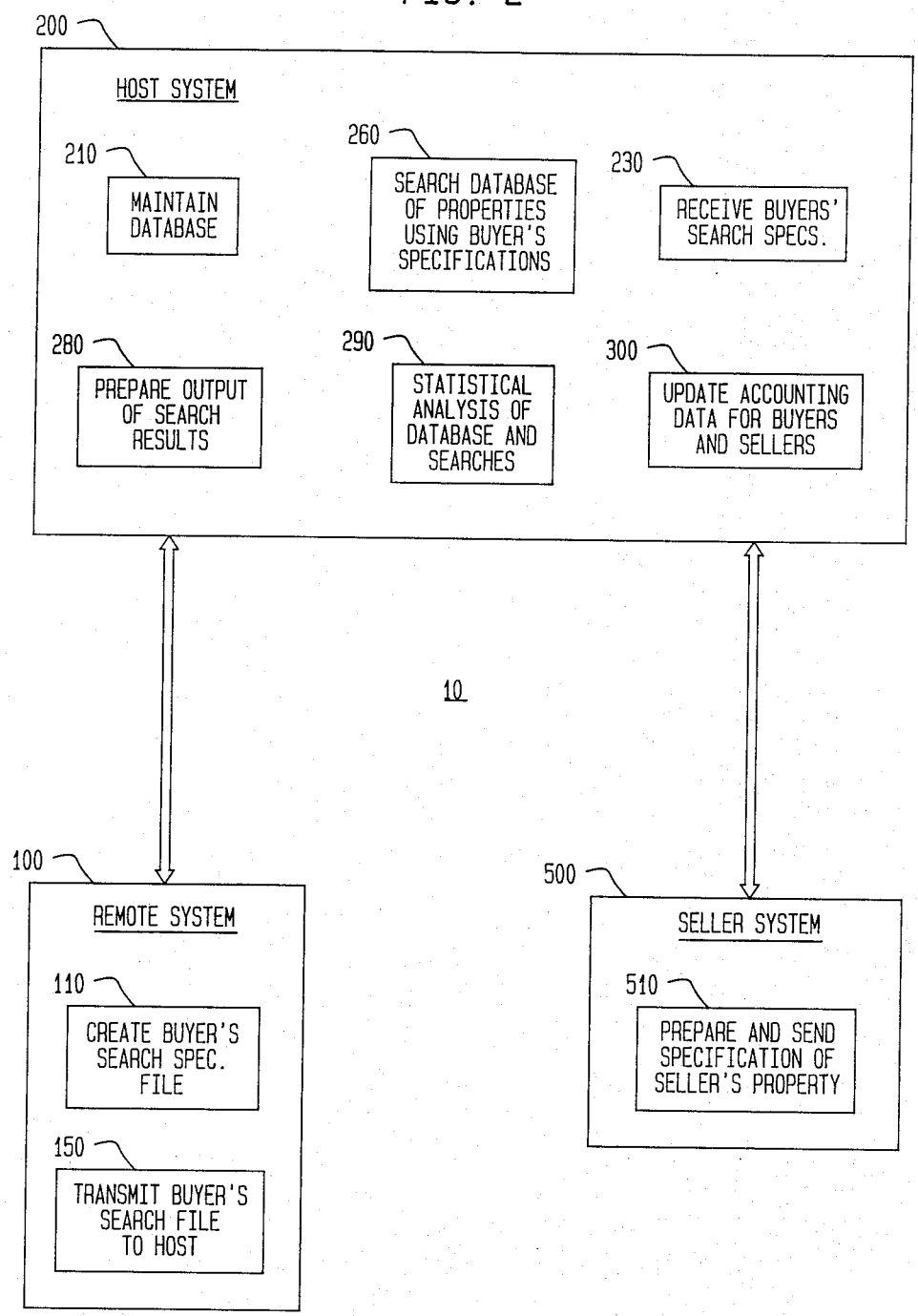
FIG. 2 is a functional block diagram of the system of the present invention.

Referring now to FIG. 2, there is shown a procedural overview block diagram of the present invention. The system 10 of the present invention comprises three principal components, host system 200, remote system 100, and seller system 500. It will be understood that although only one seller system 500 is shown, a plurality of such systems exist and interface to host 200. Similarly, although only one remote system 100 is shown a plurality of such systems exist and interface to host 200. The procedural components of host system 200 include maintain database procedures 210, search database procedures 260 receive buyers search specification procedures 230, prepare output of search result procedures 280, statistical analysis procedures 290, and accounting procedures 300.

Maintain database procedures 210 first deletes listings that are no longer of use and then adds new listings to the database. The source of new properties in the database is seller system 500 wherein complete specifications are prepared and delivered to host system 200 through a variety of means. Database maintenance procedures 210 also include an additional amount of information added through a location system for new properties to be described later.

Database search procedures 260 includes an application of buyer search specifications to the database. The receiving of buyer search specifications is conducted via telecommunications link 20 depicted in FIG. 1. Remote systems according to the present invention are interfaced via a modem or other such telecommunications device to host system 200 which controls its own telecommunications line and receives information from remote systems with validation and error-checking procedures. On receipt of such valid information a search specification is built within host system 200 and is queued for later processing during an off-line period in the host. Receipt of a buyer specification file is acknowledged to the remote system and a status message is delivered prior to termination of the telecommunications link. The output of a database search, if successful, will include a listing of a given buyer identification number followed by the serial numbers of those property listings in the database which fall within the range of specification created by the buyer. This listing which pairs buyers with located properties then permits further processing in host system 200.

The output listing from host system 200 is stored in three files. The first file is the identification of the search which identifies the actual buyer, the search name, and the serial numbers of any properties which have been selected. In addition, a list of mailing labels is created with the names and addresses of the buyers for whom searches have been performed. This list of mailing labels is created by referencing the buyer identification number against the host system accounting files.

Another procedure in host system 200 counts the number of times each property listing serial number was selected during batch processing and writes that information to a file. Subsequently duplicates of the individual property advertisements are made. Then, during the further processing, the searches are collected from these duplicates and placed with the printed search results into an envelope with the corresponding mailing label and shipped to the buyer.

Another function of host system 200 is accounting functions 300. These accounting functions include charging for services rendered to both sellers and buyers. Sellers are charged by the number of days that their property advertisement is listed in the database. The buyer is charged by the search. For each property selected the buyer is charged. Similarly, the buyer is charged for a search having a null result.

Typically the charge to buyers is done on a declining balance arrangement, wherein a minimum charge of a certain number of balance units is applied regardless of the outcome of any transmitted search, including invalidity of search data.

Yet another function of host system 200 is statistical analysis functions 290. Statistical analysis may occur on the total contents of the database at any given time, the average contents of the database over a longer period of time, or statistical analysis may be performed to detail the nature of search specifications being transmitted to host system 200.

There are three basic types of variables used in the system of the present invention: (1) numerical; (2) array or menu selection; and (3) floating point location. For numerical data, minimum, maximum and standard deviation is computed. For a percentage of the total for each selection is computed. Finally a count of the number of property listings in the database and a percentage of those with a mortgage, and an average mortgage rate are calculated. A second major component of system 10 is remote system 100. Remote system 100 is comprised of two principle subsystems: create search specification file 110 and transmit search file 150. Create search specification file 110 is the module seen by potential buyers of properties wishing to interrogate host system database 202. The unique user interface incorporated within module 110 includes a graphical locator which permits precise location of desired area for property purchase with reference to a global coordinate system. This location is done through the use of manipulator keys which allow positioning of a graphical interface selector in order to locate both property location and distance specifications without resort to numeric data on the part of the user.

From the main on-screen menu, the user selects the create option. The system displays the graphical locator interface which draws a map on the display (shown in FIG. 3A). Superimposed over the map is a window box that is non-destructive. The user has control of the position and size of the window box through a set of keys. Also on-screen is a distance indicator which calculates the distance in miles from the center of the window box to a changeable landmark location on the map. The user can display a list of landmarks; change the selected landmark and the actual display is automatically updated. The landmark is also labeled on the map. After selecting the landmark, moving the window box, and selecting its size, the user activates a key sequence to "zoom" the display. In other words, the viewport will then display the actual boundaries of the window box so that that display appears to have zoomed down closer to earth (shown in FIG. 3B). A "rubber band" circle then appears which is normalized to the size of the viewport. The user may move this circle on the display and also change its size. There is displayed a radius indicator indicating the actual radius of the circle in miles along with a corresponding distance indicator from the specified landmark. Once the user has selected his search boundary by selecting an appropriate circle, that data may be saved or changed.

After saving the location data, the user is prompted for numerical range data, such as minimum and maximum price for the target listing. After having selected several numerical ranges, a series of menus are displayed so that the user may select one or several selections on each menu.

After the completion of the questioning cycle, all data entered by the user is stored as a search specification. The user is then allowed to print hard copy of the search specification prior to subsequent transmission of the search specification to the host system. A second procedure allows editing of a previously created search specification. This process termed "update" presents a list of the parameters entered by the user and allows any given parameter to be modified, subsequently re-saving the data and again presenting menu choices for transmission to the host, further update, and creation.

After creation and validation of search specifications and approval of the final specification by the buyer, such specification is transmitted via telecommunications links 20 to host system 200 for application to the database. After database search, results are prepared as previously described and are transmitted back to the potential buyer for his use.

A final component of system 10 is seller system 500, which comprises preparation of a property specification 510. Such a property specification contains the same data which is interrogated by a potential buyer, but such data is definite and not in ranged numerical form. This is obvious since a seller generally only has a fixed number of, for instance bedrooms in his house, and would not necessarily specify that he has a house containing 2 to 4 bedrooms. After preparation of a seller specification for a property, that information is transmitted to host system 200 and used in database maintenance for entry of new property information into the database. After entry, such new property information becomes available for search by all buyers.

Referring now to FIG. 4, there is shown a detailed flow chart for Create Specification Procedure 110, which is part of remote system 100. Create Specification Procedure 110 begins at the block labeled start 112 and proceeds to initialize the various memory locations and variables required for its own internal processing at block 114. After initialization, the procedure obtains a new center and radius (location information) from the user at 116. Obtaining location information will be described more fully hereinafter. After locating a desired search boundary, the system prompts for and receives input regarding various specifications of a property at 118. Such specifications include ranges for price, lot size, number of bedrooms, and other numerical data, as well as menu selections for home style, sewage system, roof type, and other such housing elements. After receiving and validating all such information, a specification file labeled SRPROP.DAT is written to a mass storage device for saving until future processing can commence at 120. Finally, the file so written is transmitted to host system 200 at block 122 and processing to create a property stops at stop block 124. Block 122 is depicted on FIG. 2 as procedure transmit buyer search file to host 150.

Figure 5:
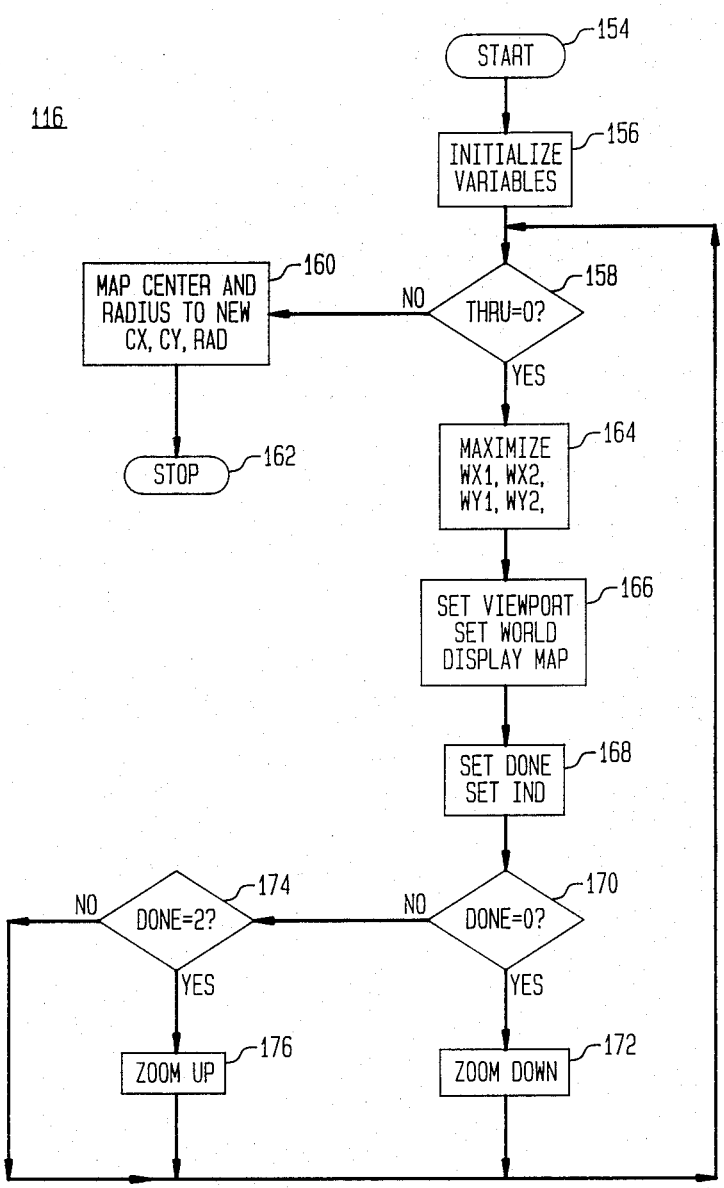
FIG. 5 is a flow diagram of the procedure obtained new center and radius for display circle.

Referring now to FIG. 5, there is shown a more detailed view of procedures required for obtaining new center and radius for property location purposes shown as block 116 on FIG. 4. The procedures for obtaining a new radius and center depend upon the creation of a scaled map (shown in FIGS. 3A,B) of the target area over which the database contains properties. This map is generated on a display screen for use by the user. Procedure 116 begins at start block 154 and initializing its own variables in order to begin processing. Such variables are local in scope and do not interfere with initialization processing conducted by the calling routine at 114. At decision 158, it is determined whether the user has completed his selection process for location and is through with the procedure. If the user is not through, processing proceeds at block 164 wherein window coordinates are maximized in order to give a maximal overview of the map area contained within the database. In this way, the fullest amount of area available within the database is shown on the screen at once.

The map is then displayed according to these set coordinates at block 166. At block 168 user input is taken in the form of pre-defined key strokes which indicate a desired user action. The procedure interprets these key strokes and sets a pair of variables to indicate the next action to be performed. At decision block 170, an evaluation of the variable "DONE" is performed. If DONE is equal to 0, this is indicative of the fact that the user wishes to zoom the display downward, that is, obtain a more detailed view of a smaller area of the map, and zoom down procedure 172, described more fully hereinafter, is executed. In the event that done is not equal to 0, evaluation 174 checks whether done is equal to 2. If it is, this is an indication that the user wishes to zoom up, that is, view a larger area of the map with correspondingly less detail, also described hereinafter. In the event that done is not equal to 0 or 2 as determined in decisions 170 and 174, processing continues by looping to execute decision 158 to determine whether the user has indicated that he is finished with the property location selection procedure. If the user is finished, as indicated at decision 158, the new center and radius of the selected region are stored in variables indicative of the center CX and CY and indicative of the radius RAD and processing terminates at stop operation 162.

Figure 6:
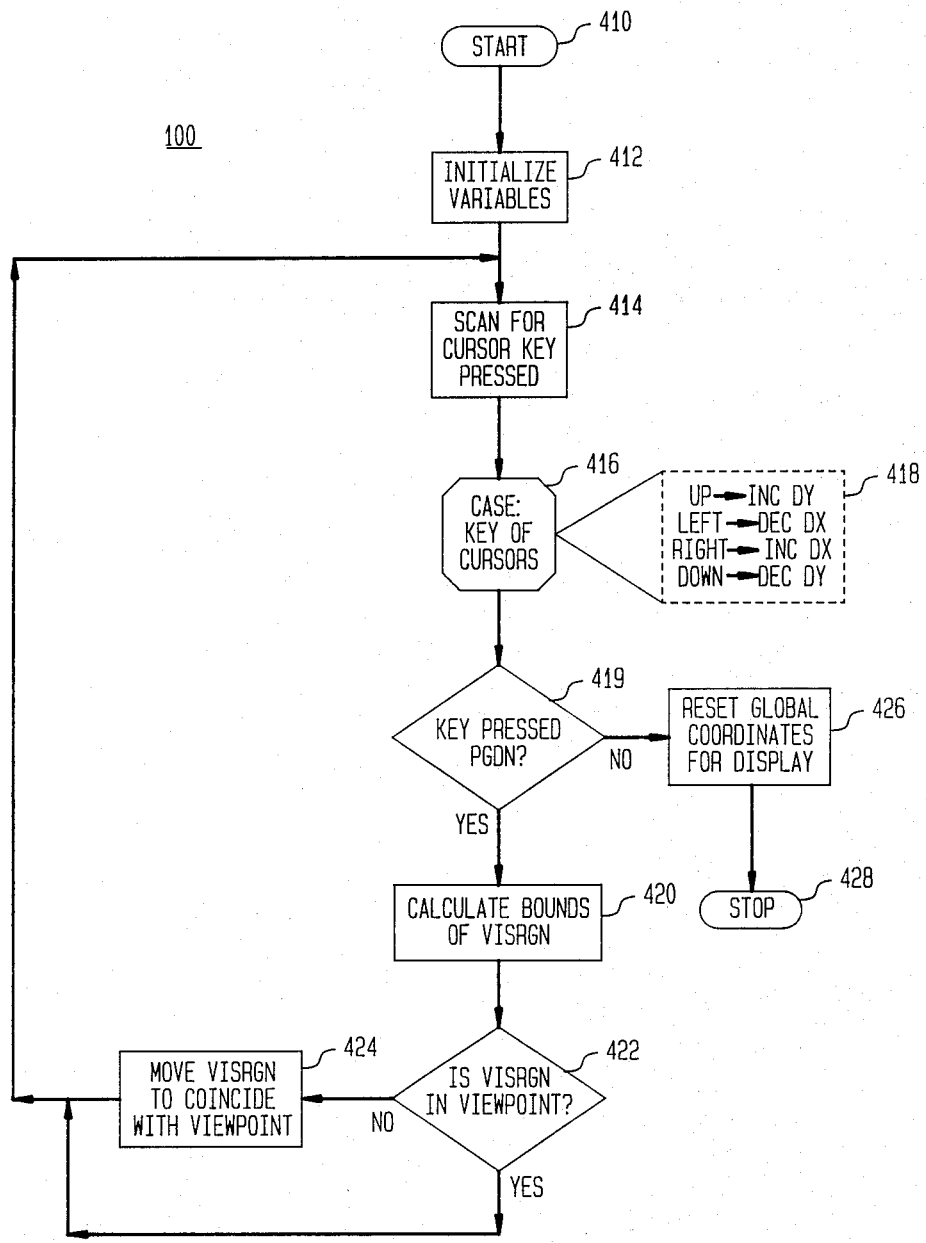
FIG. 6 is a flow diagram of a generalized procedure for the zooming of the map display of the present invention.

Operations 172 zoom-down and 176 zoom-up are depicted as a general procedure type in FIG. 6 as zoom view system 400. Processing begins at start block 410 and proceeds through a local initialization of variables at block 412.

After variable initialization, actual key strokes are monitored by the program so that the initialized position variable can be incremented or decremented to change the size or location of the circle or window box. All corresponding variables that are associated with the center locations are updated with these incremental values.

In the specific case of operation of the remote system on an IBM personal computer, various special keys located on the cursor key pad are indicative of desired functionality within the zooming procedures. For instance the plus (+) symbol key is indicative of the users desiring a zoom-out operation while the minus (−) symbol key is indicative of the users desiring to zoom-in the display. The cursor keys, left arrow, right arrow, up arrow, and down arrow, move the center location of the viewing selection region (whether a rectangle or a circle) in directions corresponding to north, south, east, and west. The page down (PgDn) key actually executes a selected zoom by changing the world coordinate system to match the view selector. The page up (PgUp) key resets the world coordinate system to its maximum, thus zooming out. After the selection of zoom mode and function, the bounds of the region which is to be visible on the screen, are calculated at operation 420. Decision 422 indicates whether the user has attempted to move the window box past the bounds of the viewport. If such an attempt has been determined at decision 422, operation 424 resets the incremental step value applied to the location variable to 0 to prevent further movement of the window box. Processing then loops and continues at scan for cursor key operation 414.

In the special case of the actuation of the page down (PgDn) key, detected in operations 416 and 418, and compared for in decision 419, the indication that the user is satisfied with the new coordinates of the window box results in operation 426 wherein the global coordinates are reset to the parameters defined for the new window box. Processing then terminates at stop operation 428.

Figure 7:
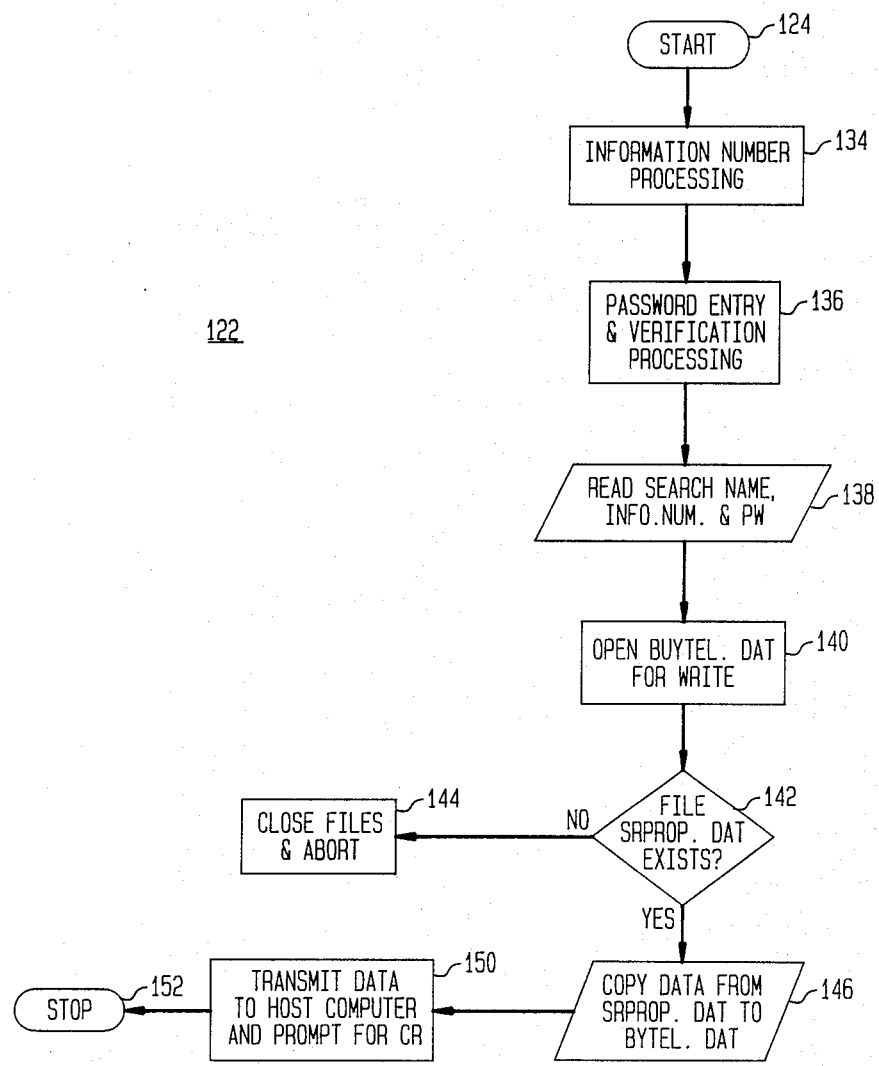
FIG. 7 is a more detailed flow diagram of the procedure close SRPROP.DAT and transmit to host system.

Close and transmit operation 122 of system 110 is detailed more fully in FIG. 7 which depicts system 122, prepare to transmit search file to host. FIG. 7 depicts the preparation of the search file for transmission which commences operation at start block 124 and proceeds to process the information number which is indicative of the particular buyer using the system at 134. At 136, the user is prompted to enter a password and that password is verified for its format.

At I/O operation 138, the search name information number and password are read and, if valid, at block 140 a file "BUYTEL.DAT" is opened for writing. Decision 142 verifies that the previously created SRPROP.DAT file exists. If the file does not exist, no search data is available and no branch is taken to operation 144 which closes all files and imports the transaction because of a lack of search data. Assuming such search data exists, the data is copied from SRPROP.DAT to BUYTEL.DAT at operation 146. Processing then proceeds to transmitting the data at operation 150, and then terminates at stop block 152.

Figure 8:
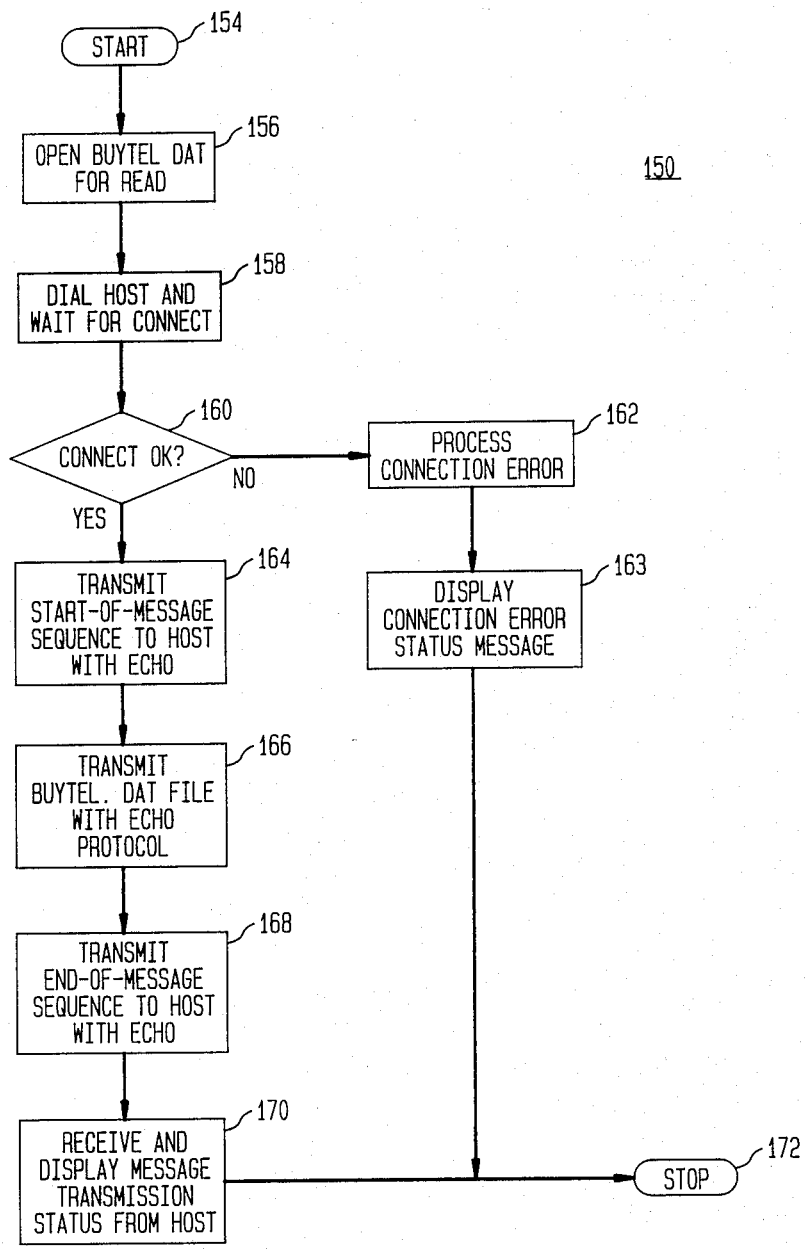
FIG. 8 is a more detailed flow diagram of the procedure transmit data to host computer and prompt for CR.

Referring now to FIG. 8, there is shown a more detailed flow chart of the operations of transmission operation 150. Transmission operation 150 commences operation at start block 154. At operation 156, the previously created BUYTEL.DAT file is open for read, and at block 158 the modem is instructed to dial the telephone to the host system 200 and wait for verification of connection with that system. At decision 160, a verification of correct connection parameters is made. If the connection is incorrect due to telecommunications network conditions such as busy signal or no answer, a connection error is indicated at block 162 and processing continues by displaying a connection error message at block 163 and terminating at stop block 172. Provided that the connection has occurred successfully as determined at decision 160, operation 164 transmits a start-of-message sequence to the host processor using an echoed protocol. This start-of-message sequence is transmitted and a loop is entered to verify that an identical message is returned from the host via the telecommunication link. The loop also contains a loop counter which permits only a predetermined number of errored returns before a communications line error is indicated and the transmission processing is aborted. This echoed protocol is used for all transmission from the remote system 100 to host system 200 and assures integrity of transmitted and received data.

At block 166 the entire contents of file BUYTEL.DAT are transmitted one character at a time with a similar echoed protocol for error checking purposes. Assuming a correct transmission having less than the specified number of permissible errors, at block 168 the remote system transmits an end-of-message sequence which is similarly echoed by the host. After receiving the end-of-message sequence, the remote system waits for a message transmission indicating the status of the received file as determined by host 200 at block 170. After receiving and displaying to the user the message transmission status, processing terminates at stop block 172.

Figure 9:
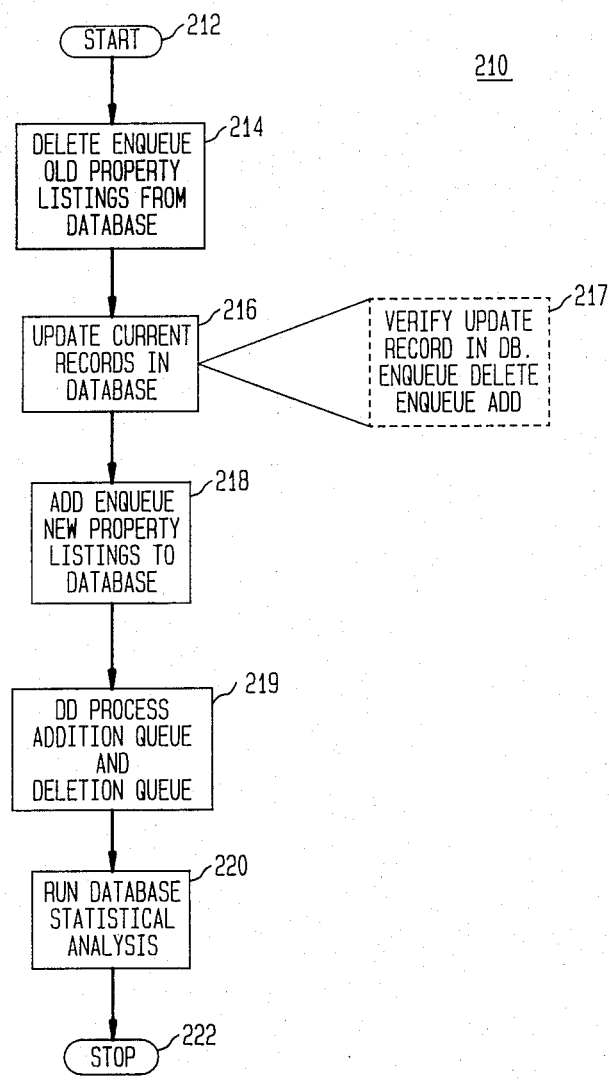
FIG. 9 is a flow diagram of the procedure maintain data base.

Referring now to the processes and systems comprising host system 200, maintain database processing 210 shown in FIG. 9 commences at start block 212 and first queues for deletion property listings whose time in the database has expired as indicated by explicit orders to remove or an expiration indicated from the seller account file at 214. At block 216 the changes to current records in the database are processed by update. This process includes a verification of the presence of a record for the property in the database, a queuing of a deletion of that existing record, and a queueing of the adding of the updated record for that property. At block 218 all new properties are queued for addition to the database, and at block 219 the deletions queue and then the additions queue are applied to the database in order to bring the database up to current daily condition. Finally, a statistical analysis of the newly updated database is performed at 220 and processing terminates at stop block 222.

Figure 10:
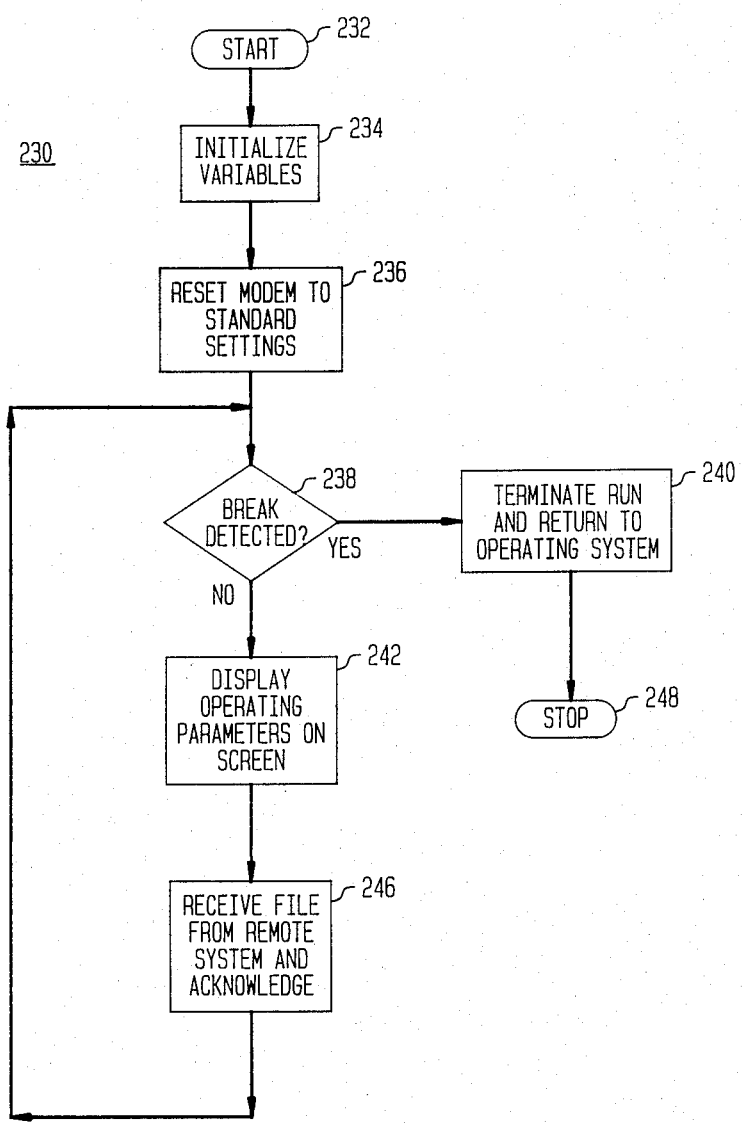
FIG. 10 is a flow diagram of the procedure receive buyers search specifications.

The receive buyer search specification process 230 within host 200 is detailed more fully in FIG. 10. Processing begins at start block 232 and proceeds to initialize the required variables for its operation at 234. At 236 the modem is reset to standard settings in order to enable automatic answering and speed parameters for a particular communications device. At decision 238 an analysis of whether a special command from the operator termed "Break" has been encountered as performed. If "Break" has been encountered, the Yes branch is taken to block 240 and the run is terminated and the operating system for the CPU restarted. Processing then terminates at stop block 248. If "Break" has not been detected, then the operating parameters of the system are displayed for the host operator at block 242 and at block 246 final reception is performed and acknowledged. Processing then loops to another determination of whether the operator has requested a "Break" in the system.

Figure 11:
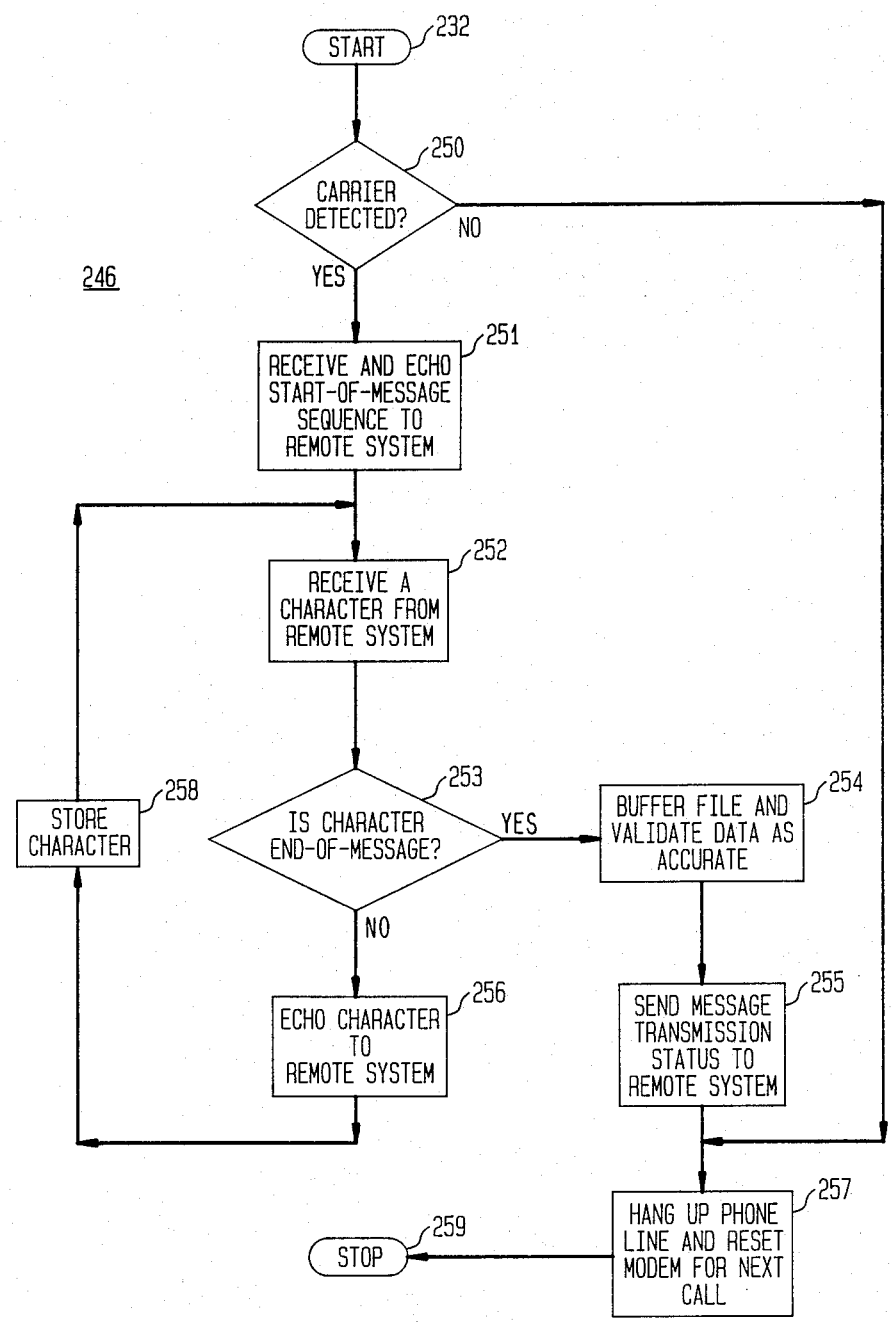
FIG. 11 is a flow diagram of the procedure receive file from remote system and acknowledge.

Referring now to FIG. 11, there is shown a more detailed view of block 246 receive file for remote system and acknowledge. Processing begins at start block 232 and proceeds to decision 250 wherein a carrier detect (CD) is monitored. If no carrier has been detected, then processing proceeds to block 257 wherein the phone line is hung up and the modem is reset for the next call. Processing then terminates at block 259. If a carrier is detected at decision 250, then the modem is taken off-hook and ready to receive information. At block 251 a start-of-message sequence is received and echoed to the remote system. It should be noted that the remote system will continue to transmit the start-of-message sequence until it has received a valid echo of the start-of-message sequence and thus operation 251 is in fact a loop which does not terminate until a non-start-of-message sequence character is detected. At block 252 a non-start-of-message character is received from the remote system. Decision 253 determines whether that received character is an end-of-message. If the character received is not an end-of-message, block 256 is executed to echo the character to the remote system for validation. The valid character is then stored for further processing and the loop reiterated by branching to block 252 to receive yet another character. If a received character is determined at decision 253 to be an end-of-message signal then processing continues at block 254 which buffers the file and validates the data contained in the file as being accurate. At block 255 the results of the validation are transmitted as a message transmission status to the remote system and at block 257 the phone line is hung up and the modem reset for the next call. Processing then terminates at block 259.

Figure 12:
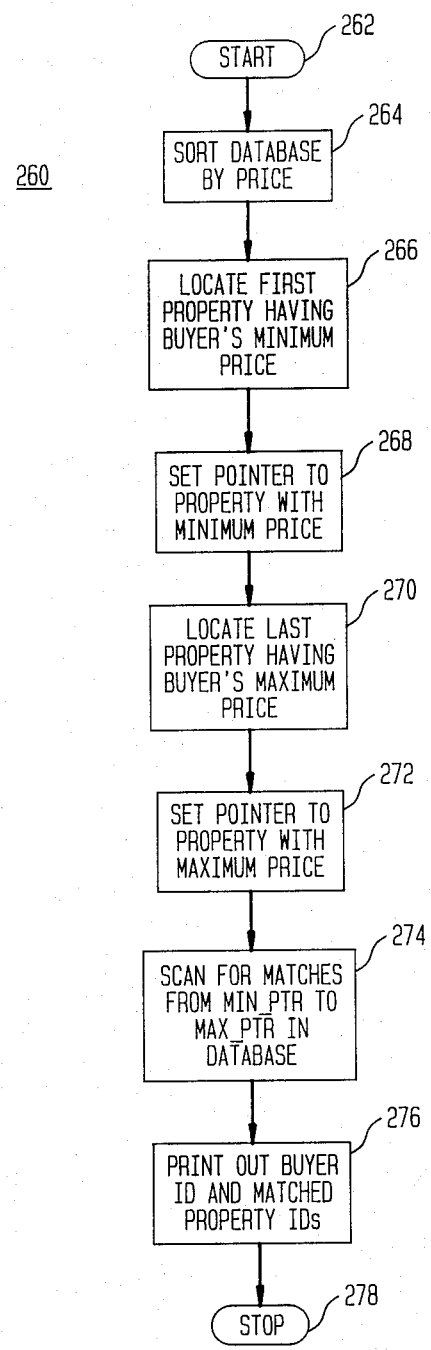
FIG. 12 is a flow diagram of the procedure search data base of properties using buyers specifications.

Referring now to FIG. 12, there is shown a more detailed view of function 260 search database of properties. Processing commences at start block 262 and first proceeds to operation 264 wherein the data-base is sorted according to the price of properties contained therein. At block 266 the first property having the buyers specified minimum price is located, and at block 268 a pointer is set to point to that record containing the property. At block 270 the last property having the buyer specified maximum price is located and at block 272 a second pointer is set to the record containing that property. At block 274 a complete scan of all properties between the two pointers is conducted for matching all parameters specified by the buyer in the transmitted file. Those properties matching the specified parameters are saved as property serial numbers and at I/O operation 276 the buyer ID for the particular search being processed together with the property serial numbers located during the matching process are written to a storage device for further processing. Additionally, information extracted from the accounting file containing the buyers name and address information for mailing label purposes is written to a storage device for further processing. Processing then terminates block 278.

Figure 13:
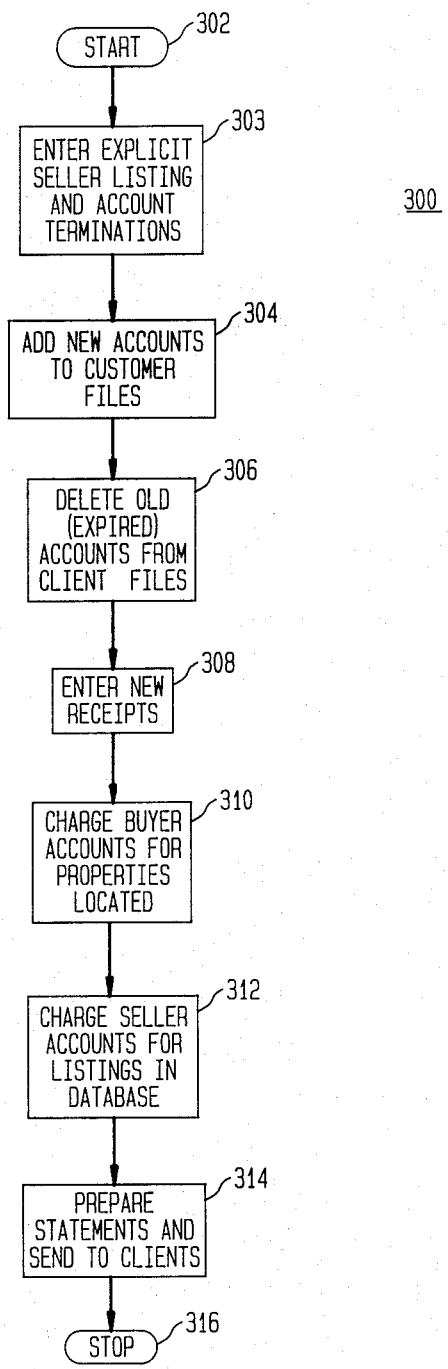
FIG. 13 is a flow diagram of the procedure update accounting data for buyers and sellers.

Referring now to FIG. 13, there is shown the accounting function 300 of host system 200. Processing begins at start block 302 and proceeds to block 303 where explicit seller listing account terminations are entered into the accounting system. Such terminations occur upon the sale of a property, generally, and cause the seller to be immediately cleared from the system. At block 304 new accounts received are added to the client files for both sellers and buyers. At block 306 old expired accounts are removed from the client files, both for buyers and sellers. At block 308 new cash receipts are entered into the system and at block 310 buyer accounts are debited according to the number of searches and/or properties located in searches, according to the formulas previously described. At block 312 seller accounts are charged for the maintenance of property listings within the database. At block 314 the accounting files are scanned and statements are prepared for transmission to clients. Processing terminates at block 316.

Further details pertaining to the preferred embodiment are presented in the Appendix. This Appendix can be found in the patented file.

Preferably, the present invention may be implemented on an IBM or compatible personal computer system. Assuming sufficient memory and mass storage, the host system, seller system and remote system may operate on separate computers which communicate via the public telephone network using conventional modems.

The system software used to implement the system may include MicroSoft MS-DOS TM, HALO TM graphics, and a language compiler such as MicroSoft C, or its equivalent.

While the present invention has been described with reference to certain specific instances and examples, it will be understood by those skilled in the art that these are merely illustrative and are in no way intended to limit the scope of the invention. The true spirit and scope of the invention should therefore be construed only by reference to the appended claims.

I claim:

1. A method for locating available properties for purchase comprising the steps performed by a computer of:
   (a) selecting a landmark as a reference point from a list of available landmarks;
   (b) displaying a map showing said selected landmark, a first area selection cursor having boundaries and information about distance and direction from the center of said first cursor to said landmark;
   (c) accepting commands to cause the location of said cursor to traverse said displayed map in any cardinal direction and to change the size of said first cursor;
   (d) zooming said displayed map to coincide with the boundaries of said first cursor thereby displaying a higher level of detail;

(e) accepting an indication of completion of said first cursor traversal and size change and converting the area enclosed by said first cursor to values representative of geographic location and maximum distance from said geographic location.
(f) transmitting said data set to a host processor;
(g) receiving said data set by said host processor;
(h) searching a database of properties by said host processor using said received data set;
(i) identifying properties by said host processor within said database which match data indicative of criteria contained in said received data set; and
(j) transmitting by said host processor, information about said identified properties.

2. The method of claim 1 comprising the steps of:
(k) displaying said zoomed map, a second area selection cursor enclosing an area, and information about the distance and direction from the center of said second cursor to said landmark;
(l) accepting commands to cause the location of said second cursor to traverse said displayed map in any cardinal direction, and to change the radius of said second cursor;
(m) accepting an indication of completion of said cursor traversal and size change and converting the area enclosed by said cursor to values representative of geographic location and maximum distance from said geographic location.

3. A method for specifying the approximate geographic location of a real estate property comprising the steps of:
(a) selecting a landmark as a reference point from a list of available landmarks;
(b) displaying a map showing said selected landmark, a first area selection cursor having boundaries, and information about the distance and direction from the canter of said first cursor to said landmark;
(c) accepting commands to cause the location of said first cursor to traverse said displayed map in any cardinal direction and to change the size of said first cursor;
(d) zooming said displayed map to substantially coincide with the boundaries of said cursor, thereby displaying a higher level of detail;
(e) displaying said zoomed map, a second area selection cursor enclosing an area and information about the location of the center of said second cursor relative to said landmark.

4. The method of claim 3 further including the steps of:
(f) accepting commands to cause the location of said second cursor to traverse said displayed map in any cardinal direction, and to change the radius of said second cursor;
(g) accepting an indication of completion of the second cursor traversal and radius change and converting the area enclosed by said cursor to values representative of geographic location and maximum distance from said geographic location.

* * * * *